United States Patent [19]

McCoy

[11] Patent Number: 4,720,290

[45] Date of Patent: Jan. 19, 1988

[54] REDUCTION OF LIQUID ATOMIZER DROPLET SIZE

[75] Inventor: Duane C. McCoy, McMurray, Pa.

[73] Assignee: Conoco Inc., Wilmington, Del.

[21] Appl. No.: 796,370

[22] Filed: Nov. 8, 1985

[51] Int. Cl.[4] .......................... B03C 3/01; B01D 51/00

[52] U.S. Cl. .......................................... 55/10; 55/90

[58] Field of Search ..................... 239/8, 9, 10; 55/10, 55/84, 90, 122, 224, 257 R

[56] References Cited

U.S. PATENT DOCUMENTS

| | | | |
|---|---|---|---|
| 2,998,391 | 8/1961 | Jones et al. | 239/9 X |
| 3,490,204 | 1/1970 | Kalika | 55/224 X |
| 3,568,404 | 3/1971 | Walker | 55/10 X |
| 3,716,190 | 2/1973 | Lindlof | 239/8 X |
| 3,764,069 | 10/1973 | Runstadler, Jr. et al. | 239/8 |
| 3,873,023 | 3/1975 | Moss et al. | 239/9 X |

*Primary Examiner*—Kathleen J. Prunner
*Attorney, Agent, or Firm*—Cortlan R. Schupbach

[57] ABSTRACT

The dispersing ability of atomizing nozzles is improved by dissolving a portion of the dispersion gas into the subject liquid at pressures of at least 50 psi. Explosive expansion of the dissolved gas in the nozzle greatly aids atomization. Further atomization effects are obtained by adding a surfactant to the subject liquid.

4 Claims, No Drawings

REDUCTION OF LIQUID ATOMIZER DROPLET SIZE

This invention relates to method for decreasing the size of liquid droplets formed using atomizer nozzles. More specifically, the present invention deals with means for decreasing the size of liquid droplets formed using atomizer nozzles by placing at least one internal gas with the liquid stream to be atomized at a pressure of at least 50 psi prior to the ejection of said stream into an environment which allows explosive expansion of the dissolved gas more finely dividing the produced liquid droplets.

STATE OF THE ART

Atomizing nozzles are normally two fluid nozzles which utilize high-pressure gas to cause atomization of the liquid as the liquid passes through the atomizer nozzle. The gas flow is external to the liquid and effectively "blows" high-pressure gas into the exiting liquid in order to more finely disperse the subject liquid. Representative but non-exhaustive examples of such art are U.K. Patent Specification No. 1,002,769 which teaches the use of a two fluid nozzle to humidify dust-laden gas prior to being fed to an electrostatic precipitator (ESP). Japanese patent publication No. 050987 discloses use of a surfactant mist in a two-fluid nozzle to humidify such dust-laden gas feed. U.S. Pat. No. 3,137,446 discloses multiple two-fluid nozzle installations, which two-fluid nozzles are taught to produce minute and uniform liquid particles using air supplied from an air source and a liquid supplied from a liquid source and piping both through the same mixing chamber. U.S. Pat. No. 3,033,643 teaches a liquid atomizer utilized for the formation of aerosols by mixing air of the room intimately in a mixing chamber with the liquid to be atomized, then utilizing a further partial stream of room air in the expanding atomized mixture such that the atomized liquid in the condensing zone will precipitate impurities in the gas.

However, there exist applications where the current state of the atomizer nozzle art do not provide maximum efficiencies. For example, during the use of humidification in increasing the efficiency of electrostatic precipitators (ESP) used in the clean up of flue gases exiting coal fired boilers, it would be desirable to more rapidly lower the exiting flue gas temperature while providing humidification all occuring within existing ductwork. In order to achieve humidification while rapidly lowering temperature, it is necessary that humidification liquid be contacted with the exiting flue gases in as fine a droplet size as possible, thereby greatly decreasing evaporation time and rapidly increasing the rate at which the flue gas is cooled.

It is therefore an object of the present invention to provide an improved method for reducing liquid atomizer droplet size. Other objects will become apparent to those skilled in this art as the description proceeds.

I have now found that atomization of liquids can be greatly increased by utilizing an internal gas flow. While theoretical in nature and I do not wish to be bound thereby, I believe the increased atomization of my invention is obtained by evolving gas inside the formed liquid droplets to cause bursting of the liquid droplets into even smaller droplets than are normally produced utilizing any given atomizer nozzle. The present invention dissolves gases into the liquid to be atomized at elevated pressures of at least 50 pounds per square inch (psi) and generally in the range of from 100 to 1000 psi. In addition, the further use of surfactants to reduce liquid surface tension provides even greater explosive breakage of the droplets. The gas evolution thus produced bursts the originally formed liquid droplets into even smaller droplets. Use of the surfactant creates additional droplet surface by reducing the liquid surface tension during gas evolution.

In addition, I believe that the gas evolution inside the liquid droplets utilizing surfactant promotes the formation of small (micro) bubbles, which produces additional surface area for heat and mass transfer and thus causes more rapid evaporation. The formed micro bubbles also provide surfaces on which dust particles contained in the air stream can adhere. Such adherence greatly improves the operation of downstream dust collection equipment such as ESPs.

Thus, the present invention deals with an improved method for decreasing the size of liquid droplets formed using a fluid atomizer nozzle, the improvement comprising placing at least one internal gas at a pressure of at least 50 psi within the liquid stream to be atomized prior to ejection of said stream into an environment which allows said internal gas to explosively expand, said expansion more finely dividing the produced liquid droplets.

The present invention does not require total saturation of the gas at the nozzle outlet. The present invention simply requires there be sufficient vaporization driving force at the nozzle outlet conditions to ensure explosive expansion of the dissolved gases or vapors. However, it is preferred that said internal gas be substantially completely dissolved in said liquid stream and that said liquid stream be substantially saturated at outlet conditions in order to achieve maximum droplet division.

In addition, it is preferred that the liquid stream additionally contain an effective amount of a surfactant capable of reducing the surface tension of said liquid stream.

In a preferred embodiment, the present invention provides an improved method for decreasing the size of liquid droplets using two-fluid atomizer nozzles, wherein the improvement comprises placing at least one internal gas at a pressure of at least 50 pounds per square inch (psi) within the liquid stream to be atomized prior to ejection of said stream into an environment which allows said internal gas to explosively expand and thereby more finely divide the produced liquid droplets. The invention is particularly useful in flue gas humidification processes, wherein the liquid stream comprises water and the dissolved gas is a volatile gas.

In such flue gas humidification processes using water, preferred internal gases are selected from the group consisting of nitrogen, oxygen, ammonia, $CO_2$, or gases selectively absorbed by water from combustion flue gases.

In such processes, representative but non-exhaustive examples of suitable surfactants are alcohol alkoxylates, linear alkane sulfonates, or fluoroalkylated alcohol alkoxylates.

In a most preferred embodiment, the present invention comprises an improved process for the removal of particulate matter from flue gases by contacting said flue gas with a humidifying liquid, then subjecting said humidified flue gas to particle separation to produce a substantially particulate free flue gas, wherein the improved process comprises (1) venting a first portion of said particulate free flue gas while (2) dissolving a second portion of said particulate free flue gas in said humidifying liquid in amount sufficient to substantially saturate said humidifying liquid at a pressure of at least 50 psi with soluble flue gas components, and venting non-soluble flue gas components, (3) passing said gas saturated humidifying liquid through an atomizing nozzle where a second gaseous fluid such as steam, air, or flue gases impinges upon said gas saturated humidifying liquid immediately prior or immediately subsequent to ejection of gas saturated humidification liquid from the nozzle in a particulate-laden flue gas humidifying chamber, said saturated gas expanding explosively to more finely divide the expelled humidifying liquid droplets, thereby more completely contacting particulate matter in the flue gas with humidifying liquid and (4) subjecting the humidified, particulate-laden flue gas to particulate separation to provide a substantially particle-free flue gas which is vented (1) or dissolved (2).

Of the various particle separation means, electrostatic precipitation and baghouses are preferred and of these, electrostatic precipitation is most preferred.

It will be realized by those skilled in this art that when utilizing flue gas as a source of dissolved gases in the humidifying liquid, normally water, water will selectively dissolve primarily carbon dioxide from the flue gas, which carbon dioxide constitutes the primary portion of the dissolved gases.

The instant invention is more completely described with reference to the Example below wherein all parts and percentages are by volume unless otherwise specified. The Example is provided to illustrate the present invention and not to limit it.

EXAMPLE 1

A slip stream of cleaned flue gases is fed to a final protection filter to remove fine particulate matter. Gas from the filter is charged to a compressor where the pressure is raised to a level of between 100 to 1000 psi. While higher pressures are possible, such will normally not be necessary since rapid dissolution will occur and should be carried out for reasons of convenience and economics at as low a pressure as possible. The compressed gases are cooled and fed to a gas/liquid contactor, such as a packed or tray tower, a lift pipe or other device known to those skilled in the art. Water is circulated through the contactor to absorb gases, primarily carbon dioxide, from the compressed gas. The remaining gas is fed via a flow control to a humidifier nozzle to act as the second fluid impinging upon the expelled liquid stream. Any excess gas is vented. A portion of the gas-saturated water from the gas liquid contactor is fed to the humidifier nozzle using temperature control. If desired, a surfactant can be metered into the liquid stream which is flowing to the humidifier. Water is made up in the system as needed using a high-pressure makeup water pump.

Typical operating conditions for flue gas humidification are set forth in Table 1.

TABLE 1

| | |
|---|---|
| Contactor Operating Pressure | 300 psig |
| Contactor Operating Temperature | 100° F. |
| Liquid Rate to Nozzle | 1 GPM/Nozzle |
| Gas Rate to Nozzle | 70 SCFM/nozzle |
| Number of Equilibrium Stages | 1 |
| Feed Gas Composition: | Mol % |
| $N_2$ | 81 |

TABLE 1-continued

| | |
|---|---|
| $CO_2$ | 11 |
| $O_2$ | 8 |

Table 1 conditions and 1 equilibrium stage in flue gas humidification will provide a re-expanded gas volume of about 1.5 times the volume of the liquid. This volume is calculated using the following calculations wherein
$N_i$ = mole fraction of component i in gas phase
$K_i$ = Gas-liquid partition coefficient for component i
$X_i$ = mole fraction of i in liquid phase

Example 1 Calculations

Assume L = 0.716   V = 0.284 - Mol frac liquid/vapor

Moles
$N_2$ = 70 SCFM × mol/379 SCF * 0.81 = 0.1496
$CO_2$ =                             * 0.11 = 0.0203
$O_2$ =                              * 0.08 = 0.0148
$H_2O$ = 1 gal/min * 8.33 lb/gal * mol/18.015 lbs = 0.4624

| | Moles | Mol Frac $N_i$ | $K_i$ | $X_i$ = $N_i/(L + VK_i)$ | $Y_i$ = $X_i K_i$ |
|---|---|---|---|---|---|
| $N_2$ | 0.1496 | 0.2312 | 4745 | 0.000172 | 0.8137 |
| $CO_2$ | 0.0203 | 0.0314 | 116 | 0.000933 | 0.1082 |
| $O_2$ | 0.0148 | 0.0229 | 2443 | 0.000033 | 0.0806 |
| $H_2O$ | 0.4624 | 0.7145 | 0 | 0.998045 | 0 |
| | 0.6471 | 1.0000 | | 0.999183 ≅ 1.00 | 1.0025 ≅ 1.00 |

SCF gas dissolved in liquid = 0.001138 mol gas/mol soln * (0.716*0.6471) mol soln * 379 SCF/mol = 0.1997 SCF gas
CF of liquid ≅ (0.716*0.6471) mol soln * 18.015 lb/mole * ft³/62.4 lb = 0.1338 ft³
Volume of gas/volume of liquid = 0.1997 SCF/0.1338 ft³ = 1.49 ft³/ft³

It is apparent that when the gas evolves from solution rapidly due to the highly turbulent conditions in the atomizer nozzle and the reduced pressure conditions of the environment into which it is being expelled, droplet shattering due to explosive expansion occurs.

The present invention is also useful in flue gas desulfurization processes, especially those which involve a humidification step.

Although the type of nozzle utilized is not critical to the present invention, it is preferred that atomizing nozzles and particularly two-fluid atomizing nozzles be used. Representative but non-exhaustive examples of suitable nozzles useful in the practice of the present invention are Swirl-Air ® nozzles, trademark of and sold by Delavan Company, Spraying Systems Co. atomizing nozzles, Sonic Development Company atomizing nozzles, Fluid Kinetics Company atomizing nozzles, Heat Systems Ultrasonic atomizing nozzles, and BETE FOD Nozzle Inc., atomizing nozzles.

While certain embodiments and details have been shown for the purpose of illustrating the present invention, it will be apparent to those skilled in this art that various changes and modifications may be made herein without departing from the spirit or scope of the invention.

I claim:
1. An improved process for the removal of particulate matter from flue gases, comprising contacting said particulate laden flue gases with a humidifying liquid and subjecting said humidified particulate-laden flue gases to particle separation to produce substantially particulate-free flue gases, the improvement comprising
   (1) venting a first portion of said particulate-free flue gases, while
   (2) dissolving a second portion of said particulate-free flue gases in said humidifying liquid in amounts sufficient to substantially saturate said humidifying liquid at a pressure of at least 50 pounds per square inch with soluble flue gas components and venting non-soluble flue gas components, (3) passing said gas-saturated humidifying liquid through a two-fluid atomizing nozzle, where a second gaseous fluid impinges upon said gas saturated humidifying liquid immediately prior or immediately subsequent to ejection from the nozzle in a particulate-laden flue gas humidifying chamber wherein said contacting is effected, said saturated gas thereby expanding to more finely divide the expelled humidifying liquid droplets, more completely contacting the particulate matter in the particulate-laden gases with humidifying liquid.

2. A method as described in claim 1 wherein particle separation is carried out using electrostatic precipitation or a baghouse.

3. A method as described in claim 1 wherein the dissolved gas substantially comprises $CO_2$ and the humidifying liquid substantially comprises water.

4. A method as described in claim 3 wherein the water to be atomized contains a surfactant.

* * * * *